United States Patent
Rehfus et al.

(10) Patent No.: US 11,181,158 B2
(45) Date of Patent: Nov. 23, 2021

(54) BRAKE POSITION AND WEAR DETECTION SYSTEMS AND METHODS

(71) Applicant: Goodrich Corporation, Charlotte, NC (US)

(72) Inventors: Kevin Rehfus, Dayton, OH (US); Joseph E Beason, Kettering, OH (US); David Drennen, Bellbrook, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/684,168

(22) Filed: Nov. 14, 2019

(65) Prior Publication Data

US 2020/0080608 A1    Mar. 12, 2020

Related U.S. Application Data

(62) Division of application No. 14/689,816, filed on Apr. 17, 2015, now Pat. No. 10,570,974.

(51) Int. Cl.
| | |
|---|---|
| *F16D 66/02* | (2006.01) |
| *B60T 17/22* | (2006.01) |
| *F16D 55/36* | (2006.01) |
| *F16D 121/24* | (2012.01) |

(52) U.S. Cl.
CPC .......... *F16D 66/025* (2013.01); *B60T 17/22* (2013.01); *F16D 55/36* (2013.01); *F16D 2121/24* (2013.01)

(58) Field of Classification Search
CPC ...... F16D 66/025; F16D 66/021; F16D 66/02; F16D 55/36; F16D 2066/003; F16D 2066/005; F16D 2066/006; F16D 2121/24; B60T 17/22

USPC ....................................................... 188/1.11 L
See application file for complete search history.

(56) References Cited

U.S. PATENT DOCUMENTS

| | | | |
|---|---|---|---|
| 5,522,259 | A | 6/1996 | Schmidt et al. |
| 5,848,672 | A | 12/1998 | Brearley et al. |
| 6,003,640 | A | 12/1999 | Ralea |
| 6,095,293 | A | 8/2000 | Brundrett et al. |
| 6,279,694 | B1 | 8/2001 | Bohm |
| 6,462,497 | B1 | 10/2002 | Rinsma et al. |
| 6,471,015 | B1 | 10/2002 | Ralea |

(Continued)

FOREIGN PATENT DOCUMENTS

| | | |
|---|---|---|
| DE | 102012006105 | 9/2013 |
| EP | 1793477 | 6/2007 |

(Continued)

OTHER PUBLICATIONS

USPTO, First Action Interview Office Action dated Oct. 22, 2019 in U.S. Appl. No. 15/658,184.

(Continued)

*Primary Examiner* — Xuan Lan Nguyen
(74) *Attorney, Agent, or Firm* — Snell & Wilmer L.L.P.

(57) ABSTRACT

The present disclosure provides an electromechanical brake actuator system comprising an electromechanical brake actuator coupled to a derived position sensor, the derived position sensor comprising a controller, a rotation sensor, and an output drive circuit. In various embodiments, the derived position sensor may be configured to receive a first motor shaft angular velocity at a first time, receive a second motor shaft angular velocity at a second time, calculate a linear translation distance, and sum the linear translation distance and a previous ram position to obtain an actual ram position.

4 Claims, 6 Drawing Sheets

(56) References Cited

U.S. PATENT DOCUMENTS

| | | |
|---|---|---|
| 6,536,562 B1 | 3/2003 | Bohm |
| 6,702,069 B2 | 3/2004 | Ralea |
| 7,108,107 B2 | 9/2006 | Ralea |
| 7,129,658 B2 | 10/2006 | Ether |
| 7,673,721 B2 | 3/2010 | Bailey |
| 7,847,679 B2 | 12/2010 | Copeland et al. |
| 8,230,983 B2 | 7/2012 | Bailey |
| 9,610,927 B2 | 4/2017 | Ayichew |
| 9,663,078 B1 | 5/2017 | Rook |
| 2005/0258681 A1 | 11/2005 | Fulks |
| 2005/0269872 A1 | 12/2005 | Ralea |
| 2007/0235267 A1 | 10/2007 | Liebert |
| 2008/0092641 A1 | 4/2008 | Cahill et al. |
| 2008/0283346 A1 | 11/2008 | Ralea |
| 2009/0205910 A1 | 8/2009 | Cahill |
| 2010/0286881 A1 | 11/2010 | Cahill |
| 2012/0221184 A1 | 8/2012 | Pfohl et al. |
| 2015/0330470 A1 | 11/2015 | Siebke |
| 2016/0041058 A1 | 2/2016 | Georin |
| 2016/0076609 A1 | 3/2016 | Narula |
| 2016/0339881 A1 | 11/2016 | Abbott et al. |

FOREIGN PATENT DOCUMENTS

| | | |
|---|---|---|
| GB | 2457376 | 8/2009 |
| WO | 9850711 | 11/1998 |

OTHER PUBLICATIONS

USPTO, Corrected Notice of Allowance dated Jan. 10, 2020 in U.S. Appl. No. 14/689,816.

USPTO, Advisory Action dated May 7, 2020 in U.S. Appl. No. 15/658,184.

USPTO, Final Office Action dated Feb. 27, 2020 in U.S. Appl. No. 15/658,184.

Extended European Search Report dated Aug. 29, 2016 in European Application No. 16165751.5.

Mastrocola, U.S. Appl. No. 15/658,184, filed Jul. 24, 2017 and entitled Brake Position System.

Mastrocola, U.S. Appl. No. 15/658,067, filed Jul. 24, 2017 and entitled Brake Position System.

Communication Pursuant to Article 94(3) EPC dated Dec. 22, 2017 in European Application No. 16165751.5.

USPTO, Restriction/Election Requirement dated May 28, 2019 in U.S. Appl. No. 15/658,184.

USPTO, Pre-Interview First Office Action dated Jul. 15, 2019 in U.S. Appl. No. 15/658,067.

USPTO, Pre-Interview First Office Action dated Aug. 16, 2019 in U.S. Appl. No. 15/658,184.

USPTO, Notice of Allowance dated Sep. 16, 2019 in U.S. Appl. No. 15/358,067.

USPTO, Requirement for Restriction Office Action dated Jun. 21, 2016 in U.S. Appl. No. 14/689,816.

USPTO, Pre-Interview First Office Action dated Sep. 28, 2016 in U.S. Appl. No. 14/689,816.

USPTO, First Action Interview Office Action dated Feb. 14, 2017 in U.S. Appl. No. 14/689,816.

USPTO, Final Office Action dated May 10, 2017 in U.S. Appl. No. 14/689,816.

USPTO, Advisory Action dated Aug. 9, 2017 in U.S. Appl. No. 14/689,816.

USPTO, Non Final Office Action dated Sep. 20, 2017 in U.S. Appl. No. 14/689,816.

USPTO, Final Office Action dated May 8, 2018 in U.S. Appl. No. 14/689,816.

USPTO, Advisory Action dated Jun. 18, 2018 in U.S. Appl. No. 14/689,816.

USPTO, Non Final Office Action dated Sep. 18, 18 in U.S. Appl. No. 14/689,816.

USPTO, Final Office Action dated Feb. 28, 2019 in U.S. Appl. No. 14/689,816.

USPTO, Advisory Action dated Apr. 30, 2019 in U.S. Appl. No. 14/689,816.

USPTO, Non Final Office Action dated Jul. 25, 2019 in U.S. Appl. No. 14/689,816.

USPTO, Notice of Allowance dated Oct. 17, 2019 in U.S. Appl. No. 14/689,816.

USPTO, Notice of Allowance dated Jul. 10, 2020 in U.S. Appl. No. 15/658,184.

FIG. 6 ns and Methods

CROSS-REFERENCE TO RELATED APPLICATIONS

This application is a divisional of, and claims priority to, and the benefit of U.S. Non-Provisional application Ser. No. 14/689,816, entitled "BRAKE POSITION AND WEAR DETECTION SYSTEMS AND METHODS," filed on Apr. 17, 2015, which is hereby incorporated by reference in its entirety

FIELD OF THE DISCLOSURE

The present disclosure relates to aircraft brake systems and methods, and more particularly, to systems and methods for detection of brake disc position and wear.

BACKGROUND OF THE DISCLOSURE

Conventional aircraft wheel assemblies comprise brake stacks which stop the aircraft in response to the compression of rotating and stationary brake discs by either hydraulic or electromechanical actuators. Brake discs frequently comprise carbon/carbon composite material that wears with use, decreasing the thickness of the brake discs and the height of the brake stacks. Worn brake discs are replaced when wear exceeds a predetermined amount. To detect brake disc wear, aircraft wheel assemblies often utilize a wear indicator pin to determine the height of the brake stack. Other conventional aircraft wheel assemblies utilize linear variable differential transformer ("LVDT") sensors, which electronically measure the distance between the brake stack and the brake housing to calculate brake disc wear. Manually inspection of wear indicator pins is subject to human error, and LVDT sensors are associated with the addition of hardware and electronics to the aircraft wheel assembly.

SUMMARY OF THE DISCLOSURE

In various embodiments, the present disclosure provides an electromechanical brake actuator system comprising an electromechanical brake actuator coupled to a derived position sensor comprising a controller, a rotation sensor, and an output drive circuit. In various embodiments, the controller may comprise a microcontroller. In various embodiments, the electromechanical brake actuator may comprise a ram, and the electromechanical brake actuator system may be configured to determine a position of the ram and/or a wear state of a brake stack.

In various embodiments, the present disclosure provides methods determining a position of a ram and/or a wear state of a brake stack. In various embodiments, a method may comprise obtaining an actual ram position by summing a linear translation distance and a previous ram position. In various embodiments, a method may comprise determining that a brake stack height is less than a minimum height threshold by comparing an actual ram position to a maximum extension position. In various embodiments, a method may comprise obtaining a brake stack wear distance by subtracting a worn full load position and an unworn full load position. In various embodiments, a method may comprise obtaining a running clearance position by subtracting a desired running clearance and a zero torque position. In various embodiments, a method may comprise transmitting an output signal, and/or translating a ram in a linear direction.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft brake systems. However, various aspects of the disclosed embodiments may be adapted for optimized performance with a variety of brake systems, including automobile brake systems and various other motor vehicle brake systems. As such, numerous applications of the present disclosure may be realized.

Figure 1:
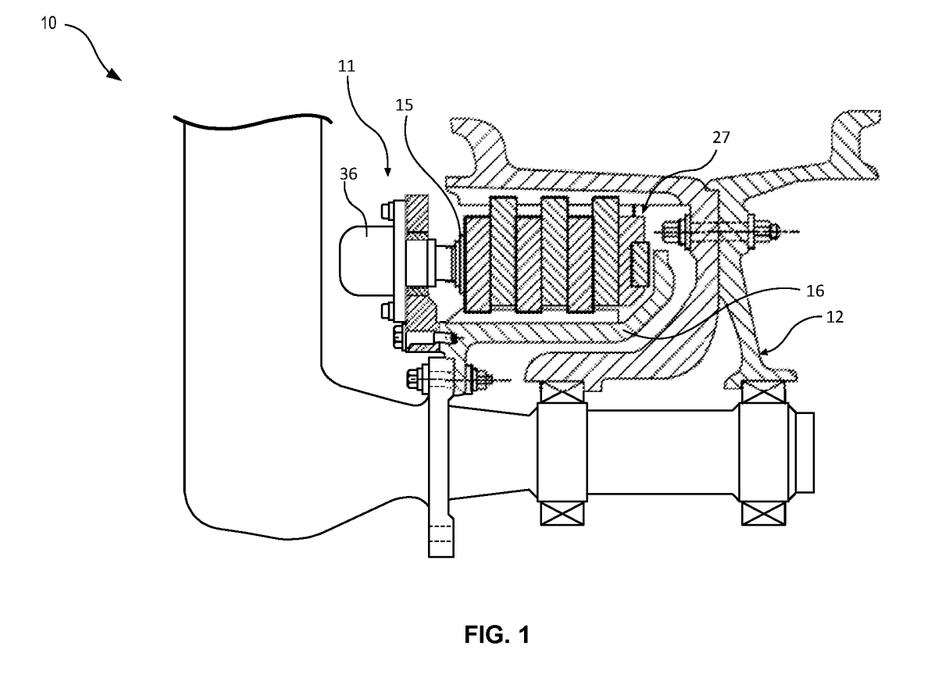
FIG. 1 illustrates a cross section view of a portion of a wheel and brake assembly in accordance with various embodiments.

With reference to FIG. 1, a portion of a wheel and brake system 10 is illustrated in accordance with various embodiments. Wheel and brake system 10 may comprise, for example, a brake assembly 11. In various embodiments, brake assembly 11 may be coupled to an axle of a wheel 12. For example, brake assembly 11 consists of rotors and stators that are compressed together by an electromechanical brake actuator 36 to reduce the speed of an aircraft. In various embodiments, brake stack 27 may comprise components that interface with both the rotating rotors, and with the wheel axle through torque tube 16.

Brake assembly 11 may further comprise, for example, one or more electromechanical brake actuators 36. For example, electromechanical brake actuators 36 may be configured such that in response to a command signal (e.g., an operator depressing a brake pedal), electromechanical brake actuators 36 laterally compress brake stack 27 which, in turn, resists rotation of wheel 12, thereby reducing the speed of the aircraft. Electromechanical brake actuator 36 may be coupled to or otherwise operate a motor shaft and a pressure generating device, such as, for example, a ram 15. In response to a command signal, electromechanical brake actuator 36 causes the motor shaft to rotate. Rotational motion of the motor shaft may be transformed into linear motion of a ball nut. Linear translation of the ball nut towards ram 15 applies lateral compression force on brake stack 27.

Figure 2:
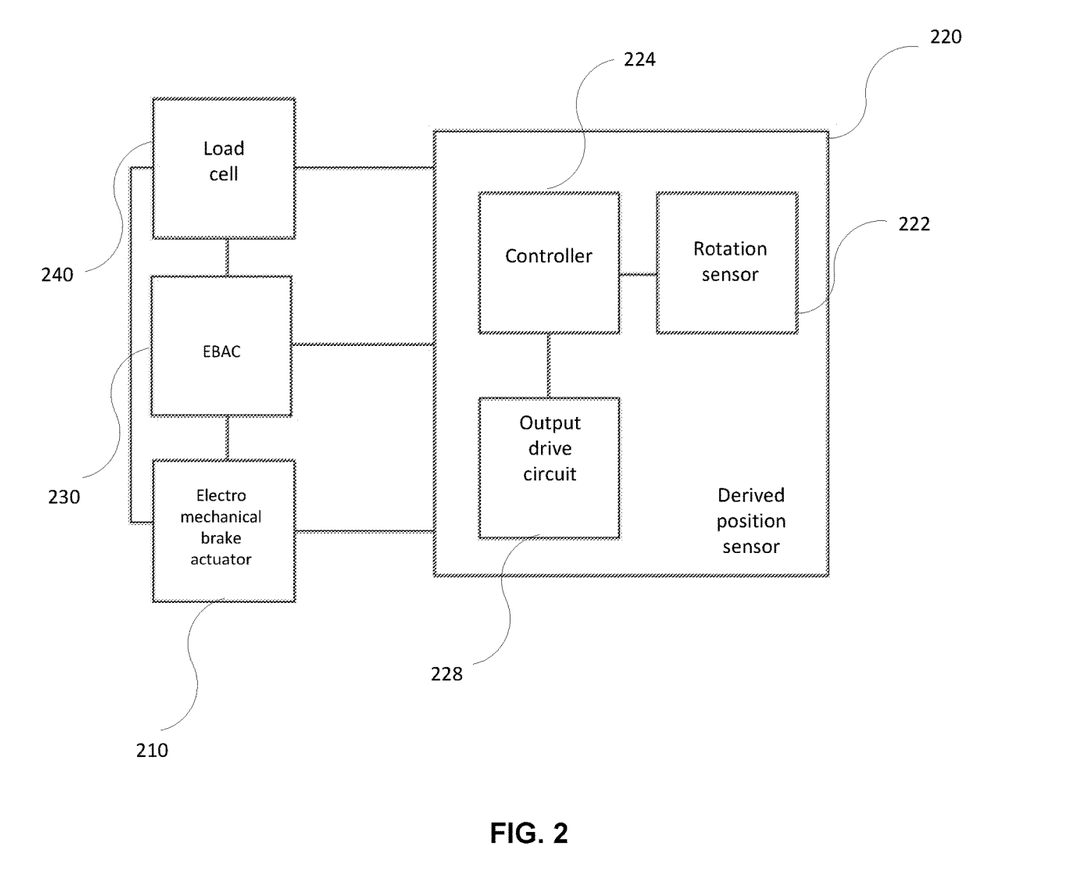
FIG. 2 illustrates a block diagram view of an electromechanical brake actuator system in accordance with various embodiments.

With reference to FIG. 2, a block diagram of an electromechanical brake actuator system 200 is illustrated in accordance with various embodiments. Electromechanical brake actuator system 200 may comprise an electromechanical brake actuator 210 coupled to a derived position sensor 220. In various embodiments, derived position sensor 220 may comprise a rotation sensor 222 and a controller 224. In various embodiments, controller 224 may comprise a microcontroller. In various embodiments, derived position sensor 220 may further comprise an output drive circuit 228 in communication with controller 224.

In various embodiments, rotation sensor 222 may comprise a resolver. In various embodiments, rotation sensor 222 may comprise a Hall effect sensor. In various embodiments, rotation sensor 222 may be coupled to electromechanical brake actuator 210 and configured to detect a signal from which the angular velocity of the motor shaft may be calculated.

In various embodiments, controller 224 may be configured to operate as a data acquisition and digital signal processing system. For example, controller 224 may receive data from rotation sensor 222. Such data may be processed, stored, and analyzed by controller 224. In various embodiments, controller 224 comprises an analog to digital converter, which may be configured to receive analog data from rotation sensor 222 and convert it to digital data for processing by controller 224.

In various embodiments, electromechanical brake actuator system 200 may further comprise an electromechanical brake actuator controller ("EBAC") 230. After digital signal processing, data may be transmitted from controller 224 to EBAC 230. In various embodiments, controller 224 comprises an output drive circuit 228. For example, controller 224 may comprise an output drive circuit which comprises an analog drive circuit. In such embodiments, controller 224 provides data from a digital analog converter (within controller 224) to the analog drive circuit, which may transmit the analog data to EBAC 230. The analog drive circuit may comprise, for example, a 4 milliamp to 20 milliamp drive circuit.

In various embodiments, controller 224 comprises an output drive circuit which comprises a digital drive circuit. In such embodiments, controller 224 provides digital data to EBAC 230. For example, the digital drive circuit may utilize a serial communication protocol, such as, for example, an RS232 or RS485 protocol. Although described with reference to specific embodiments, any manner of transmitting data from controller 224 to EBAC 230 is within the scope of the present disclosure.

In various embodiments, controller 224 may be capable of bidirectional communication with EBAC 230. Bidirectional communication between controller 224 and EBAC 230 may, for example, allow for built in testing to evaluate the health of EBAC 230 and various sensors, and/or to detect and correct error conditions, among other functions.

In various embodiments, electromechanical brake actuator system 200 may further comprise a load cell 240. In various embodiments, load cell 240 may be in communication with at least one of controller 224, electromechanical brake actuator 210, and electromechanical brake actuator controller 230.

Figure 3A:
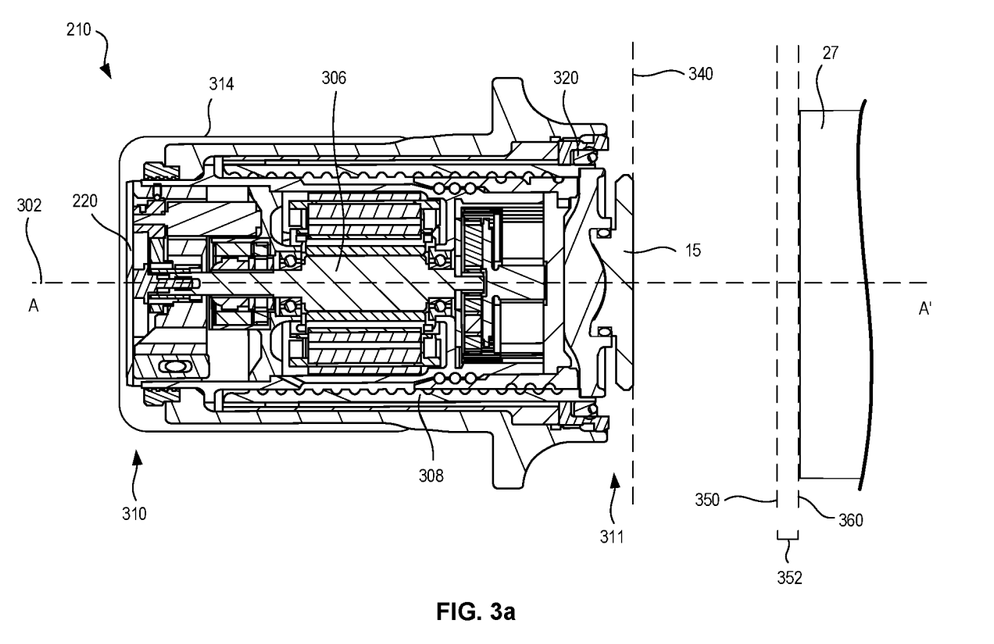
FIG. 3a illustrates cross section view of a portion of an electromechanical brake actuator system in accordance with various embodiments.
Figure 3B:
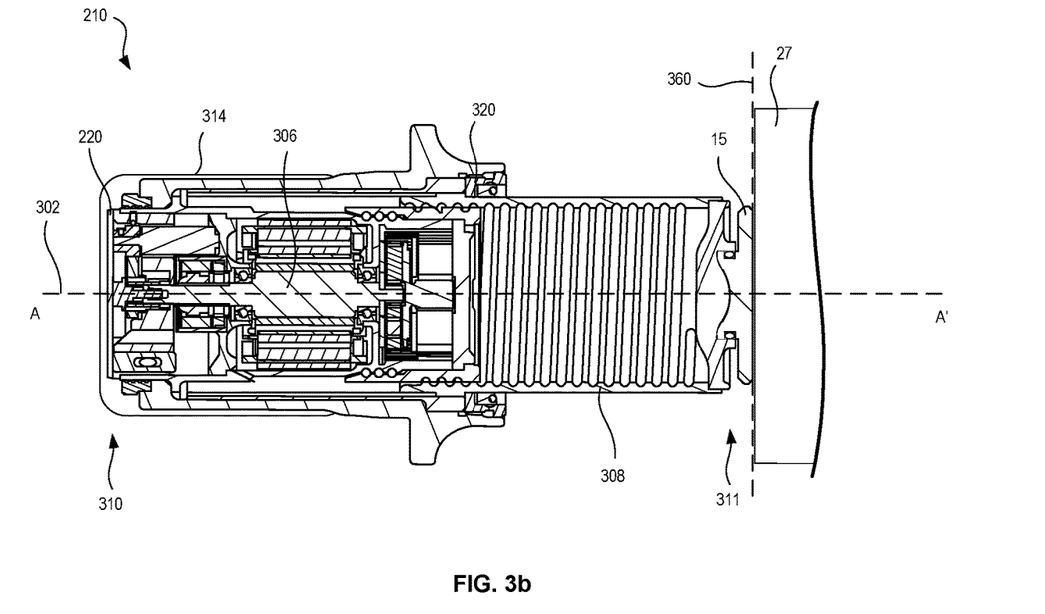
FIG. 3b illustrates a cross section view of a portion of an electromechanical brake actuator system in accordance with various embodiments.

With reference to FIGS. 1, 3a, and 3b, an electromechanical brake actuator 210 is illustrated in accordance with various embodiments. In various embodiments, electromechanical brake actuator 210 may comprise a first end 310, a second end 311, a derived position sensor 220, and a brake actuator housing 314. In various embodiments, electromechanical brake actuator 210 may further comprise a motor shaft 306 oriented about axis of rotation 302, which extends in a linear direction from A to A'. Rotational motion of motor shaft 306 is transformed into linear motion of a ball nut 308 along axis of rotation 302. Linear translation of ball nut 308 translates ram 15 in a linear direction along axis of rotation 302. In various embodiments, ram 15 may be disposed on the second end 311 of electromechanical brake actuator 210.

In various embodiments, derived position sensor 220 may be disposed on the first end 310 of electromechanical brake actuator 210. In various embodiments, at least a portion of derived position sensor 220 may be disposed between brake actuator housing 314 and motor shaft 306. In various embodiments, at least a portion of derived position sensor 220 may be disposed in electromechanical brake actuator 210, such that derived position sensor 220 is at least partially enclosed by a housing of electromechanical brake actuator 210. In various embodiments, at least a portion of derived position sensor 220 may be disposed on electromechanical brake actuator 210, such that derived position sensor 220 is coupled to an exterior surface of electromechanical brake actuator 210, a housing thereof, and/or a component thereof.

FIG. 3a illustrates electromechanical brake actuator 210 in a fully retracted state, wherein ram 15 has been translated as far as possible, or substantially as far as possible, in a linear direction towards A along axis of rotation 302. As used herein, a position of ram 15 should be understood to be a location of ram 15 along axis of rotation 302 relative to a fully retracted position 340. The location of ram 15 when electromechanical brake actuator 210 is in a fully retracted state may be referred to herein as the fully retracted position 340. As used herein, translation of ram 15 in a linear direction towards A' may be referred to as increasing and/or positive translation, movement, and/or position; translation of ram 15 in a linear direction towards A may be referred to as decreasing and/or negative translation, movement, and/or position. Stated differently, a first position of ram 15 axially closer to A' than a second position of ram 15 is to A' may be described herein as exceeding the second position of ram 15; a second position of ram 15 axially closer to A than a first position of ram 15 is to A may be described herein as being less than the first position of ram 15. FIG. 3b illustrates electromechanical brake actuator 210 in an extended state, wherein ram 15 has been translated in a positive direction and the position of ram 15 exceeds fully retracted position 340.

In various embodiments, an electromechanical brake actuator system may be configured to determine a position of ram 15. In various embodiments, a first actual ram position may be determined by translating ram 15 a first linear distance in a positive direction from fully retracted position 340, such that the first actual ram position is at a first linear translation distance from fully retracted position 340. In various embodiments, the first actual ram position may be stored by controller 224 and/or by a component external to derived position sensor 220 as a previous ram position. In various embodiments, a second actual ram position may be determined by translating ram 15 a second linear distance in a positive or a negative direction from the previous ram position, such that the second actual ram position is at a second linear translation distance from fully retracted position 340. In various embodiments, the second actual ram position may be calculated and/or determined by summing the first actual ram position and the second actual ram position, and/or by summing the first linear translation distance and the second linear translation distance. In various embodiments, the second actual ram position may be stored by controller 224 and/or by a component external to derived position sensor 220 as a previous ram position.

In various embodiments, determination of the actual ram position from a previous ram position may decrease occurrences of linear translation of ram 15 to the fully retracted position 340, thereby decreasing wear on, and/or increasing cycle life of, an actuator seal 320. Actuator seal 320 may comprise an annular ring disposed at the second end 311 of electromechanical brake actuator 210 and configured to at least partially surround ball nut 308. Actuator seal 320 may be configured to prevent and/or minimize infiltration of water, dirt, debris, contaminants, and/or the like into brake actuator housing 314. In various embodiments, determination of the actual ram position from a previous ram position may decrease linear translation of ram 15, thereby decreasing infiltration of water, dirt, debris, contaminants, and/or the like into brake actuator housing 314.

In various embodiments, controller 224 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. In various embodiments, the processor may be configured to implement smart algorithms to calculate and/or determine a position of ram 15 and/or a height of brake stack 27, (discussed below).

Figure 4:
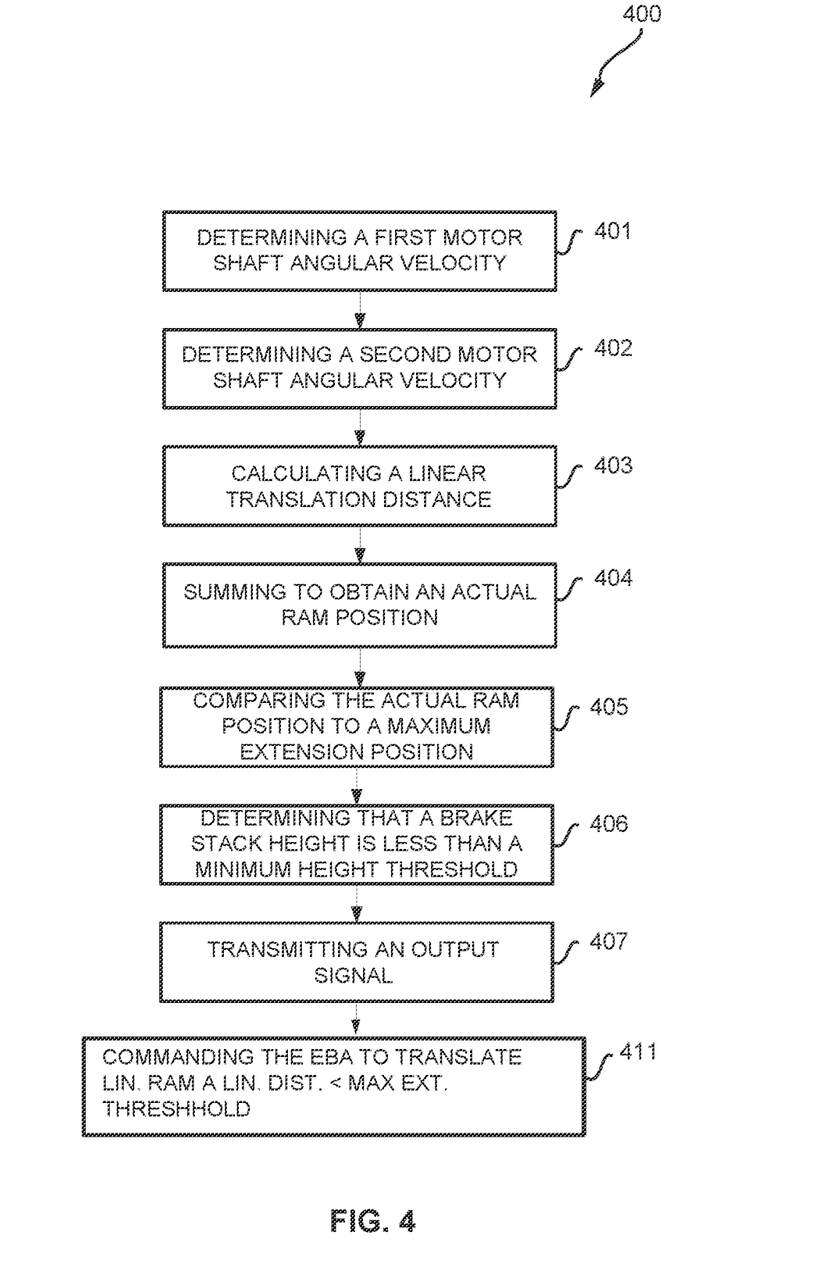
FIG. 4 illustrates a method of using an electromechanical brake actuator system in accordance with various embodiments.

In various embodiments and with reference to FIGS. 3a, 3b, and 4, the operations implemented in response to execution of instructions by controller 224 may comprise receiving a first motor shaft angular velocity at a first time (Step 401), and receiving a second motor shaft angular velocity at a second time (Step 402). In various embodiments, the operations may further comprise calculating a linear translation distance (Step 403) from at least one motor shaft angular velocity and a ball screw lead angle factor. The ball screw lead angle factor may represent the conversion of rotational motion to linear translational motion. In various embodiments, the operations may further comprise summing the linear translation distance and a previous ram position to obtain an actual ram position (Step 404). In various embodiments, the operations may further comprise transmitting an output signal (Step 407) to at least one of electromechanical brake actuator controller 230 and electromechanical brake actuator 210. In various embodiments, the output signal may comprise an analog and/or digital electrical signal.

In various embodiments, an electromechanical brake actuator system may be configured to determine a height of the brake stack. The height of brake stack 27 (with momentary reference to FIG. 1), referred to herein as a brake stack height, may comprise an axial distance from a first axial end of brake stack 27 to a second axial end of brake stack 27. Whether the brake stack height is less than a minimum height threshold may be determined by comparing the actual ram position to a maximum extension threshold. In various embodiments, the maximum extension threshold may comprise a position of ram 15 at which, and/or greater than which, the brake stack height is less than a minimum height threshold. In various embodiments, the minimum height threshold may comprise the brake stack height at which, and/or lower than which, brake disc replacement is indicated. In various embodiments, the maximum extension threshold may be predetermined such that it is determined or calculated at any time prior to comparison of the maximum extension threshold and the actual ram position. In various embodiments, the minimum height threshold may be predetermined such that it is determined or calculated at any time prior to comparison of the minimum height threshold and the brake stack height.

In various embodiments, the operations implemented in response to execution of instructions by controller 224 may further comprise comparing the actual ram position to a maximum extension position (Step 405). In various embodiments, the operations may further comprise determining that the brake stack height is less than a minimum height threshold, in response to the actual ram position exceeding the maximum extension position (Step 406). In various embodiments, the operations may further comprise transmitting an output signal (Step 407) to at least one of electromechanical brake actuator controller 230 and electromechanical brake actuator 210. In various embodiments, the output signal may communicate to the electromechanical brake actuator controller 230 that the brake stack height is less than the minimum height threshold. In various embodiments, the output signal may comprise an override command configured to override a command of the electromechanical brake actuator controller 230. In various embodiments, the override command may comprise a command to translate the ram 15 in a linear direction and/or to a position less than the maximum extension threshold.

With reference again to FIGS. 3a and 3b, in various embodiments, an electromechanical brake actuator system may be configured to determine a brake stack wear distance by subtracting a worn full load position and an unworn full load position. As used herein, a full load position may comprise a position of ram 15, wherein ram 15 has fully translated in a positive direction towards a brake in response to a full load command. In various embodiments, the full load command may cause ram 15 to exert approximately 50,042 newtons (11,250 pounds of force) on the brake stack. However, in various embodiments, the full load command may comprise any desired load to be exerted on the brake stack. In various embodiments, the full load position may be determined by a load cell and/or as a result of load cell measurements, calculations, and/or operations.

In various embodiments, the unworn full load position may comprise a full load position, wherein the brake stack has not been used and/or has not experienced wear. In various embodiments, the unworn full load position may be predetermined such that it is determined or calculated at any time prior to subtraction of the unworn full load position and the worn full load position. In various embodiments, the worn full load position may comprise a full load position, wherein the brake stack has been used and/or has experienced wear. In various embodiments, the actual ram position may comprise a worn full load position.

In various embodiments, the worn full load position and the unworn full load position may be subtracted. In various embodiments, the difference between the worn full load position and the unworn full load position may comprise the brake stack wear distance.

Figure 5:
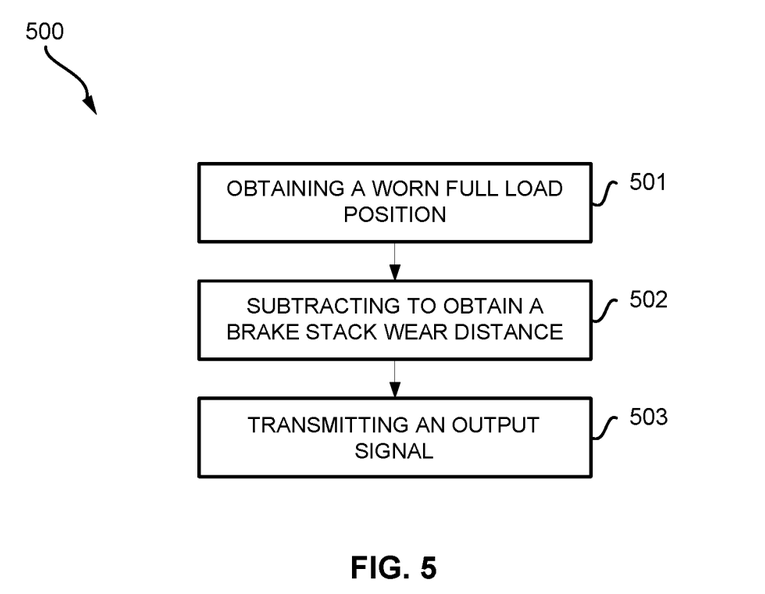
FIG. 5 illustrates another method of using an electromechanical brake actuator system in accordance with various embodiments.

In various embodiments and with reference to FIGS. 3a, 3b, and 5, the operations implemented in response to execution of instructions by controller 224 may comprise obtaining a worn full load position (Step 501). In various embodiments, obtaining a worn full load position may comprise any step of method 400, including receiving a first motor shaft angular velocity at a first time (Step 401), receiving a second motor shaft angular velocity at a second time (Step 402), calculating a linear translation distance (Step 403), and/or summing the linear translation distance and a previous ram position to obtain an actual ram position (Step 404), wherein the actual ram position comprises a worn full load position. In various embodiments, the operations may further comprise subtracting the worn full load position and an unworn full load position to obtain a brake stack wear distance (Step 502). In various embodiments, the operations may further comprise transmitting an output signal (Step 503) to at least one of electromechanical brake actuator controller 230 and electromechanical brake actuator 210. In various embodiments, the output signal may communicate to the electromechanical brake actuator controller 230 that the brake stack height is less than the minimum height threshold.

With reference again to FIGS. 3a and 3b, in various embodiments, an electromechanical brake actuator system may be configured to determine a running clearance position 350 by subtracting a desired running clearance 352 and a zero torque position 360. The desired running clearance 352 may comprise a linear distance between ram 15 and brake stack 27. In various embodiments, the desired running clearance 352 may be between about 0.1905 centimeters (0.075 inches) and about 0.381 centimeters (0.150 inches). However, the desired running clearance 352 may be any distance suitable for operation of the electromechanical brake actuator system, and/or any distance suitable to eliminate or minimize drag while also minimizing electromechanical brake actuator response time, that is, an amount of time between a command being given by the electromechanical brake actuator and application of the commanded load by the ram.

In various embodiments, the zero torque position 360 may comprise a position of ram 15, wherein the ram 15 is not in contact or is in minimal contact with brake stack 27 and exerts no lateral compression force thereon. In various embodiments, the zero torque position 360 may be determined by a load cell and/or as a result of load cell measurements, calculations, and/or operations. In various embodiments, placement of the ram 15 at the zero torque position 360 may cause drag and, consequently wear, on the brake stack 27. In various embodiments, drag and/or wear may be caused by friction and/or inaccurate load cell measurements, calculations, and/or operations.

In various embodiments, the zero torque position 360 may be obtained by the methods previously described herein. In various embodiments, the zero torque position 360 may be obtained and/or calculated from the worn full load position and a compression distance, wherein the compression distance represents a decrease in brake stack height in response to application of a full load force to the brake stack 27. In various embodiments, the zero torque position 360 may be predetermined such that it is determined or calculated at any time prior to subtraction of the desired running clearance 352 and the zero torque position 360. In various embodiments, the actual ram position may comprise a zero torque position 360.

In various embodiments, the zero torque position 360 and the desired running clearance 352 may be subtracted. In various embodiments, the difference between the zero torque position 360 and the desired running clearance 352 may comprise the running clearance position 350.

Figure 6:
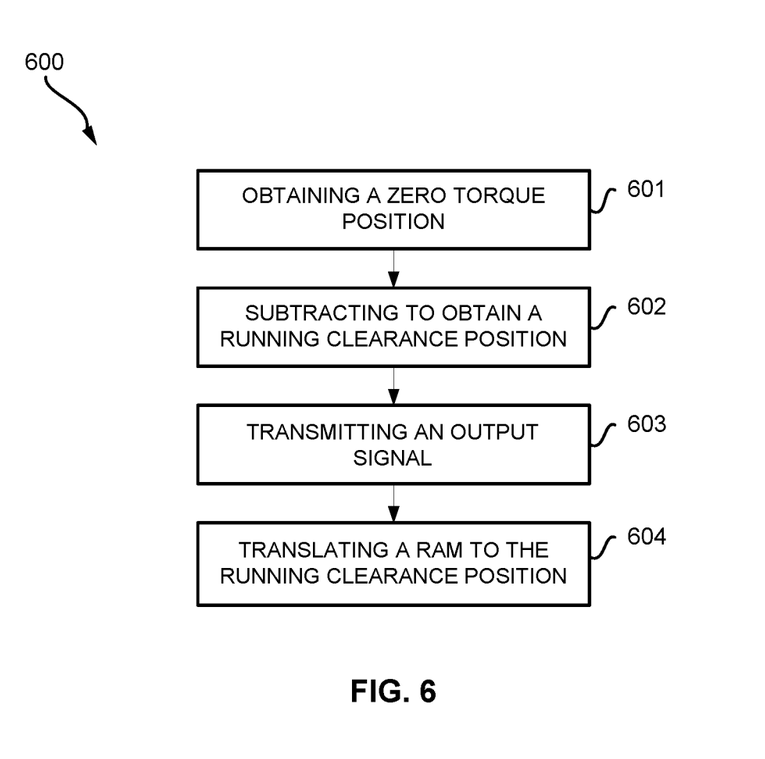
FIG. 6 illustrates yet another method of using an electromechanical brake actuator system in accordance with various embodiments.

In various embodiments and with reference to FIGS. 3a, 3b, and 6, the operations implemented in response to execution of instructions by controller 224 may comprise obtaining a zero torque position 360 (Step 601). In various embodiments, the operations may further comprise subtracting a desired running clearance 352 and the zero torque position 360 to obtain a running clearance position 350 (Step 602). In various embodiments, the operations may further comprise transmitting an output signal (Step 603) to at least one of electromechanical brake actuator controller 230 and electromechanical brake actuator 210. In various embodiments, the output signal may command the electromechanical brake actuator 210 to translate the ram 15 to the running clearance position 350 (Step 604). In various embodiments, the output signal may comprise communicating, to the electromechanical brake actuator controller 230, at least one of the running clearance and the running clearance position 350.

With reference again to FIGS. 2 and 4, a method 400 may comprise determining a first motor shaft angular velocity of a motor shaft at a first time (Step 401), wherein an electromechanical brake actuator 210 comprises the motor shaft and a ram 15, and is coupled to a derived position sensor 220 comprising a controller 224, a rotation sensor 222, and an output drive circuit 228. In various embodiments, method 400 may further comprise determining a second motor shaft angular velocity at a second time (Step 402), calculating a linear translation distance (Step 403), and summing the linear translation distance and a previous ram position to obtain an actual ram position (Step 404).

In various embodiments, method 400 may further comprise comparing the actual ram position to a maximum extension position (Step 405). In various embodiments, method 400 may further comprise determining that a brake stack height is less than a minimum height threshold, in response to the actual ram position exceeding the maximum extension position (Step 406). In various embodiments, method 400 may further comprise transmitting an output signal from the output drive circuit 228 to an electromechanical brake actuator controller 230 (Step 407). In various embodiments, the transmitting may comprise communicating to an electromechanical brake actuator controller 230 the actual ram position. In various embodiments, the transmitting may comprise communicating to an electromechanical brake actuator controller 230 that the brake stack height is less than the minimum height threshold. In various embodiments, the transmitting may comprise overriding a command of an electromechanical brake actuator controller 230 to prevent and/or reverse linear translation of the ram.

With reference to FIGS. 2 and 5, a method 500 may comprise obtaining a worn full load position (Step 501). In various embodiments, method 500 may further comprise subtracting the worn full load position and an unworn full load position to obtain a brake stack wear distance (Step 502). In various embodiments, method 500 may further comprise transmitting an output signal from the output drive circuit to an electromechanical brake actuator controller 230 (Step 503).

With reference to FIGS. 2 and 6, a method 600 may comprise obtaining a zero torque position 360 (Step 601). In various embodiments, method 600 may further comprise subtracting a desired running clearance 352 and the zero torque position 360 to obtain a running clearance position 350 (Step 602). In various embodiments, method 600 may further comprise transmitting an output signal to at least one of electromechanical brake actuator controller 230 and electromechanical brake actuator (Step 603). In various embodiments, the transmitting may comprise commanding the electromechanical brake actuator to translate the ram to the running clearance position. In various embodiments, the output signal may comprise communicating, to the electromechanical brake actuator controller 230, at least one of the running clearance and the running clearance position 350. In various embodiments, method 600 may further comprise translating a ram 15 to the running clearance position 350 (Step 604).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a controller, a first motor shaft angular velocity of a motor shaft at a first time, wherein an electromechanical brake actuator comprises the motor shaft and a ram, and is coupled to a derived position sensor comprising the controller, a rotation sensor, and an output drive circuit;
   receiving, by the controller, a second motor shaft angular velocity at a second time;
   calculating, by the controller, a linear translation distance;
   summing, by the controller, the linear translation distance and a previous ram position to obtain an actual ram position;
   comparing, by the controller, the actual ram position to a maximum extension position;
   determining, by the controller, that a brake stack height is less than a minimum height threshold, in response to the actual ram position exceeding the maximum extension position;
   transmitting, by the controller, an output signal from the output drive circuit to an electromechanical brake actuator controller in response to the actual ram position exceeding the maximum extension position.

2. The method of claim 1, wherein the controller and the electromechanical brake actuator controller are in bidirectional communication with each other.

3. The method of claim 1, wherein an override command translates the ram to a position less than the maximum extension position.

4. The method of claim 1, wherein determining the actual ram position from the previous ram position decreases an occurrence of a linear translation of the ram to a fully retracted position.

* * * * *